United States Patent [19]

Pope et al.

[11] 4,430,257

[45] Feb. 7, 1984

[54] ALCOHOL-FREE ALKOXIDE PROCESS FOR CONTAINING NUCLEAR WASTE

[75] Inventors: James M. Pope, Monroeville; Edward J. Lahoda, Edgewood, both of Pa.

[73] Assignee: The United States of America as represented by the United States Department of Energy, Washington, D.C.

[21] Appl. No.: 272,852

[22] Filed: Jun. 12, 1981

[51] Int. Cl.$^3$ ............................................... G21F 9/16
[52] U.S. Cl. ...................................... 252/629; 501/12
[58] Field of Search ............. 252/629; 501/12; 427/5, 427/6

[56] References Cited

U.S. PATENT DOCUMENTS

| | | | |
|---|---|---|---|
| 3,759,683 | 9/1973 | Dislich et al. | 501/12 |
| 3,791,808 | 2/1974 | Thomas | 501/12 |
| 3,959,172 | 5/1976 | Brownell et al. | 501/12 |
| 3,971,717 | 7/1976 | Hild et al. | 252/629 |
| 4,028,085 | 6/1977 | Thomas | 501/12 |
| 4,097,401 | 6/1978 | Guber et al. | 252/629 |
| 4,098,595 | 7/1978 | Lenz et al. | 501/12 |
| 4,123,380 | 10/1978 | Norell | 252/633 |
| 4,224,177 | 9/1980 | Macedo et al. | 252/629 |

FOREIGN PATENT DOCUMENTS 55-87100  7/1980  Japan .................................. 252/629

OTHER PUBLICATIONS

Yoldas, B., 1977, Preparation of Glasses and Ceramics from Metal-Organic Compounds, Journal of Materials Science 12: 1203–1208.

Gonzalez-Oliner, et al., 1981, Glass Ceramic Formation and the Preparation of Glasses by the Sol-Gel Method, Glass, 304–307, Aug. 1981.

Yoldas, B., 1979, Monolithic Glass Formation by Chemical Formation, Journal of Materials Science 14: 1843–1849.

*Primary Examiner*—Deborah L. Kyle
*Assistant Examiner*—Howard J. Locker
*Attorney, Agent, or Firm*—R. D. Fuerle

[57] ABSTRACT

Disclosed is a method of containing nuclear waste. A composition is first prepared of about 25 to about 80%, calculated as $SiO_2$, of a partially hydrolyzed silicon compound, up to about 30%, calculated as metal oxide, of a partially hydrolyzed aluminum or calcium compound, about 5 to about 20%, calculated as metal oxide, of a partially hydrolyzed boron or calcium compound, about 3 to about 25%, calculated as metal oxide, of a partially hydrolyzed sodium, potassium or lithium compound, an alcohol in a weight ratio to hydrolyzed alkoxide of about 1.5 to about 3% and sufficient water to remove at least 99% of the alcohol as an azeotrope. The azeotrope is boiled off and up to about 40%, based on solids in the product, of the nuclear waste, is mixed into the composition. The mixture is evaporated to about 25 to about 45% solids and is melted and cooled.

14 Claims, No Drawings

ALCOHOL-FREE ALKOXIDE PROCESS FOR CONTAINING NUCLEAR WASTE

CROSS-REFERENCE TO RELATED APPLICATION

This application is related to U.S. patent application Ser. No. 162,966 filed June 25, 1980 by J. M. Pope et al, entitled "Containment of Nuclear Waste."

This application is related to U.S. patent application Ser. No. 162,967 filed June 25, 1980 by J. M. Pope et al, entitled "Containing Nuclear Waste Via Chemical Polymerization."

BACKGROUND OF THE INVENTION

In the alkoxide process for containing nuclear waste, the nuclear wastes are mixed at room temperature into a composition of water, alcohol, and the alkoxides of various glass formers such as aluminum, boron, silicon, and sodium. The glass formers are partially hydrolyzed and form a polymerized network which enables the composition to be melted at a lower temperature than it would if the glass formers were added as oxides.

While the alkoxide process is an important improvement over prior art processes of containing nuclear waste in glass, it does present some additional problems. One such problem arises due to the presence of the alcohol that is mixed with the nuclear waste. Not only does this create the danger of an explosion which would disperse the nuclear waste into the environment, but when the alcohol is removed it may be contaminated by volatile radionuclides and would, therefore, require special handling. Until now, however, it was thought that the alcohol had to be present with the nuclear wastes to prevent the complete hydrolyzation of the boron and silicon alkoxides. A complete hydrolyzation would preclude any reaction or polymerization with the nuclear waste. In that event, the nuclear waste would not be chemically bonded to the glass and could be leached out during storage.

Another problem with the conventional alkoxide method of disposing nuclear waste is that an expensive calciner operated under controlled conditions is required to gradually remove the alcohol that is present in order to prevent an explosion when the composition containing the nuclear waste is dried (calcined) prior to melting.

SUMMARY OF THE INVENTION

We have discovered that it is possible to remove the alcohol from the glass forming composition prior to adding the nuclear waste to the composition and yet produce a glass product to which the nuclear waste is chemically bound and cannot be leached out. Because we can remove the alcohol before adding the nuclear waste we eliminate the chance of explosion or fire in the presence of the nuclear waste material. Also, when the alcohol is evaporated beforehand it is not contaminated with nuclear waste and can be handled with conventional chemical processing.

We have also discovered that the calciner can be eliminated without splattering or a steam explosion occurring in the melter. Not only does this eliminate the calciner, which is a large expensive piece of equipment, which would require remote maintenance, but it simplifies the process by eliminating an additional step.

We have found that the composition melts rapidly at a low temperature without dusting, foaming, or volatilization. In fact, in the process of our invention only about 4% of the cations (e.g., B, Na, Cs, Ru, Fe, Ce, Sr, Nd, etc.) are lost, while some other glass processes for containing nuclear waste can lose up to 50% of the cations that are present. The excellent retention of cations and the absence of splattering or a steam explosion in the melter are apparently due to thorough, intimate mixing which reactively incorporates the cations in the glass forming composition prior to entering the melter.

DESCRIPTION OF THE INVENTION

The first step in the process of this invention is to prepare the glass forming composition. The composition typically contains four glass forming components, although additional components may be added or substituted for the four components if desired. If any of the components contain alkoxides or hydrolyzable compounds they are partially hydrolyzed prior to their addition to the total composition.

The first glass forming component is prepared from a silicon compound having the general formula $SiR_m(OR')_nX_p$ or $Si(OSiR_3)_4$ where each R is independently selected from alkyl to $C_{10}$ and alkenyl to $C_{10}$, each R' is independently selected from R and aryl, each X is independently selected from chlorine and bromine, m is 0 to 3, n is 0 to 4, p is 0 to 1, and $m+n+p$ equals 4. The $SiR_m(OR')_nX_p$ compounds are preferred due to their availability, stability, and compatibility with other glass forming constituents. The R' group is preferably alkyl to $C_4$ with $n=4$ because these alkoxides are the most suitable starting compounds.

Examples of appropriate compounds which fall within the scope of the general formula include Trimethylethoxysilane: $(CH_3)_3Si(OC_2H_5)$
Ethyltriethoxysilane: $C_2H_5Si(OC_2H_5)_3$
Tetrapropoxysilane: $Si(OC_3H_7)_4$
Tetraethylorthosilicate: $Si(OC_2H_5)_4$
Tetratriethylsiloxysilane: $Si[OSi(CH_3)_2C_2H_5]_4$
Triethylchlorosilane: $(C_2H_5)_3SiCl$
Vinyltriphenoxysilane: $CH_2{:}CHSi(OC_6H_5)_3$ The preferred silicon compound is tetraethylorthosilicate because it is relatively inexpensive, readily available, stable, and easy to handle.

Before the silicon compound is added to the composition it is partially hydrolyzed because its rate of hydrolysis is slower than the other compounds, and preferential precipitation may result if hydrolyzation of the components is initiated after they have been combined. Proper hydrolyzation allows the constituents to be chemically combined and the resultant mixture to behave as a unit. Hydrolyzation may be accomplished by the addition of water to the silicon compound, where either the water, the silicon compound, or both have been diluted with alcohol. The molar ratio of a silicon compound to the alcohol can range from about 0.2 to about 2. The alcohol is preferably the same alcohol that is produced during hydrolyzation so that it is not necessary to separate two alcohols. The mole ratio of the silicon compound to the water can range from about to 0.1 to about 5. It is occasionally necessary to use up to about six drops of concentrated nitric acid per mole of water to aid in the hydrolyzation reaction.

The second component of the composition is a sodium compound, which facilitates melting. The sodium compound has a general formula $NaOR''$ or $NaZR'_3$ where each R' is independently selected from R and aryl, and R'' is R or hydrogen, and Z is carbon or boron.

The NaOR" compounds where R" is alkyl to $C_4$ are preferred to the other alkyl groups as they are more stable and compatible. The sodium compounds (other than sodium hydroxide) are partially hydrolyzed prior to being mixed into the composition. A water to alkoxide molar ratio of about 0.005 to about 0.09 may be used for partial hydrolyzation. Alcohol may be present if desired, but it is not necessary. Suitable compounds which fall within the scope of the general formula include Sodium Hydroxide: NaOH
Sodium Methylate: $NaOCH_3$
Triphenylmethylsodium: $NaC(C_6H_5)_3$
Triphenylborylsodium: $NaB(C_6H_5)_3$ Sodium hydroxide is preferred as it is low in cost, easiest to handle, and is readily available.

The third component of the composition is an aluminum compound which has the general formula $AlR'_q(OR")_rX_s$ or $Mg(Al(OR)_4)_2$, where each R' is independently selected from R and aryl, each R" is independently selected from R and hydrogen, each X is independently selected from chlorine and bromine, q is 0 to 3, r is 0 to 3, s is 0 to 1, and q+r+s is 3. The $AlR'_q(OR")_rX_s$ compounds, where r is 3 and R" is alkyl to $C_4$, are preferred to the other alkyl groups as they are the most stable and available and are the easiest to handle. Examples of suitable aluminum compounds include Aluminum Hydroxide: $Al(OH)_3$
Trimethyl Aluminum: $Al(CH_3)_3$
Triethyl Aluminum: $Al(C_2H_5)_3$
Triethoxyaluminum: $Al(OC_2H_5)_3$
Aluminum isopropate: $Al(OC_3H_7)_3$
Aluminum secondary butoxide: $Al(OC_4H_9)_3$
Triphenyl Aluminum: $Al(C_6H_5)_3$
Aluminum Magnesium Ethoxide: $Mg[Al(OC_2H_5)_4]_2$
Diethylaluminum Chloride: $(C_2H_5)_2AlCl$ The preferred aluminum compound is aluminum hydroxide as it is stable, available, and does not require special handling. These compounds (except for $Al(OH)_3$), are partially hydrolyzed prior to addition to the composition to avoid inhomogeneities. Hydrolysis can be accomplished using a molar ratio of aluminum compound to water of about 0.0007 to about 0.03. The water should be hot (i.e., between about 70° and 100° C.), and preferably between about 80° and 90° C.) to facilitate proper hydrolyzation. In addition, it may be desirable to use about 0.03 to about 0.1 moles of 1 mole of nitric acid to 1 mole of AlO(OH), which is the desired product of the hydrolyzation, to aid in its preparation. After the addition of the water, the compound is permitted to set for at least several hours at about 80° to about 90° C. to permit proper hydrolyzation and peptization to occur.

The fourth component of the composition is a compound of boron having the general formula $BR'_q(OR)_rX_s$ where each R' is independently selected from R and aryl, each X is independently selected from chlorine and bromine, q is 0 to 3, r is 0 to 3, s is 0 to 1, and q+r+s is 3. The compounds where R is alkyl to $C_4$ and r is 3 are preferred as they are relatively available and well-matched with the other components. Suitable boron compounds which fall within the scope of the general formula include Trimethyl Boron: $B(CH_3)_3$
Triethyl Boron: $B(C_2H_5)_3$
Trimethyl Borate: $B(OCH_3)_3$
Triethyl Borate: $B(OC_2H_5)_3$
Triisobutyl Borate: $B(OC_4H_9)_3$
Triisopropyl Borate: $B(OC_3H_7)_3$
Triisobutylborine: $B(C_4H_9)_3$
Dimethyloxyboron Chloride: $(CH_3O)_2BCl$
Diphenyl boric acid: $(C_6H_5)_2BOH$ Trimethyl borate and triethyl borate are preferred as they are relatively available and are compatible and require very little special handling. Before the boron compound is added to the composition it should be hydrolyzed. The molar ratio of boron compound to alcohol can cover a wide range of about 0.03 to about 0.2, but about 0.07 to about 0.05 is preferred as it avoids an excess volume and is optimal with regards to blending of the other constituents. The mole ratio of the boron compound to water can range from about 0.05 to about 5 with about 0.1 to about 1 being preferred, as that range promotes the compatible blending with the other constituents.

A calcium compound can be substituted for either the boron compound or the aluminum compound but the total amount of calcium compound in the composition, calculated as CaO, should not exceed about 15%, based on total composition solids weight. The calcium compound has the general formula of $CaR_t(OR")_uX_v$, where each R is independently selected from alkyl to $C_{10}$ and alkenyl to $C_{10}$, each R" is independently selected from R and hydrogen, each X is independently selected from chlorine and bromine, t is 0 to 2, u is 0 to 2, v is 0 to 1, and n+m+p is 2. The compounds where R is alkyl to $C_4$ and n is 2 are preferred as they are compatible and available. Examples of suitable compounds within the scope of the general formula include Diethyl calcium: $Ca(C_2H_5)_2$
Diethyl calcate: $Ca(OC_2H_5)_2$
Calcium hydroxide: $Ca(OH)_2$ These compounds may be partially hydrolyzed in the same manner as the boron compound prior to their addition to the composition. If calcium hydroxide is used, of course, it need not be hydrolyzed. Preferably, the boron and an aluminum compound are used instead of any calcium compounds as they are glass formers and produce a higher quality product.

A lithium or potassium compound may be substituted for some or all of the sodium compound. The lithium or potassium compound has the general formula KOR", $KZR'_3$, LiOR", or $LiZR'_3$ where each R' is independently selected from R and aryl and R" is R and hydrogen and Z is carbon or boron. The compounds where R" is alkyl to $C_4$ are preferred as they are more stable and compatible. The lithium and potassium compounds are hydrolyzed in the same way as the sodium compound.

The alcohol used in the compositions should be the same alcohol that is formed during hydrolyzation and all alkoxides are preferably the same so that only a single alcohol is produced, which eliminates the problem of separating different types of alcohols. Thus, any alcohol added would preferably be an alkanol to $C_4$. The total composition comprises about 25% to about 80% (all percentages herein are by weight), calculated as a $SiO_2$, of the silicon compound, up to about 30% calculated as a metal oxide, of the aluminum or calcium compound, about 5% to about 20%, calculated as a metal oxide, of the boron or calcium compound, about 3 to about 25%, calculated as a metal oxide, of the sodium, potassium, or lithium compound (MOR", $MZR'_3$, or mixtures thereof, where M is sodium, potassium, or lithium. R, $R^1$, and Z were hereinbefore defined), an alcohol in a weight ratio to hydrolyzed alkoxide from about 0.5 to about 3, and sufficient water to form an azeotrope with the alcohol. Once the components of the composition are mixed it may be necessary to add additional alcohol or water if the total present is below the indicated percentages.

Once the composition has been formed and thoroughly mixed, some of the water and all of the alcohol is boiled off as the azeotrope which completes the intimate mixing of the alkoxides and leaves an alcohol-free, homogeneous glass forming composition which is colloidal in nature and, thus, reactive and highly mixable with respect to the waste. The degree of matter removal is governed by the glass former concentration desired for delivery to the hot cell for mixing with the radioactive nuclear waste.

A description of the nuclear waste can be found in U.S. patent application Ser. No. 162,966 filed June 25, 1980 by James Pope, herein incorporated by reference.

Briefly, the nuclear waste is usually a sludge of hydrated oxides and hydroxides of elements including aluminum, iron, nickel, chromium, magnesium, manganese, silicon, sodium, mercury, neodymium, cesium, cerium, strontium, titanium, calcium, uranium, plutonium, thorium, zirconium, and molybdenum. The sludge is about 90% water and is formed by dissolving spent fuel from n-type or commercial reactors in nitric acid followed by neutralization (precipitation) with sodium hydroxide. The nuclear waste may also consist of acidic nitrate solutions of the above elements. If the nuclear waste consists of either sludge or is completely liquid, it will be highly homogenized and intimately mixed on a colloidal level with the alkoxide derived glass formers. The composition may include up to 40% by weight (not including water), calculated as the oxides, based on the weight of the product, of nuclear waste. Preferably, the composition contains about 25 to about 30% nuclear waste, calculated in the same manner.

Once the nuclear wastes have been thoroughly mixed into the glass forming composition the mixture is evaporated to about 25 to about 45% solids. This may conveniently be accomplished by heating to about 75° to about 100° C. for about 1 to about 3 hours. Preferably, the evaporation is conducted to about 35 to about 40% solids. The composition containing the nuclear waste is then fed (e.g., by pumping) into the melter where it is heated to a temperature sufficient for melting and chemical incorporation into the glass. For the preferred compositions this is about 1000° to about 1200° C., but higher temperatures may be needed for high alumina or high silica compositions which are correspondingly low in alkali content. The melting may be conducted in situ, that is, in the container used for disposal, or it may be melted in a continuous operation and the melt poured into containers for disposal. A typical container may contain up to 3,000 pounds or more of the glass containing nuclear waste.

EXAMPLE I

The following compositions were prepared to simulate different nuclear wastes. The group A wastes are simulated reprocessed commercial fuel wastes and the group B wastes are simulated defense wastes. The defense wastes were dissolved in nitric acid to give a nitrate solution and then neutralized with sodium hydroxide to precipitate solid hydroxides and hydrated oxides.

| Different Waste Compositions Successfully Incorporated in Glass |||||||||
|---|---|---|---|---|---|---|---|---|
| (A) Waste to simulate reprocessed commercial fuel Liquid nitrates in solution (wt. %, as nitrates) |||| (B) Waste to simulate defense waste, i.e., dissolved in $HNO_3$ to give nitrate, but then neutralized with NaOH to precipitate solid hydroxides and hydrated oxides: (wt. % species shown) |||||
| (A-1) | Ce | 14.8 | Zr | 13.4 | (B-1) | $Na_2SO_4.10H_2O$ | 15.8 | $Al(OH)_3$ | 0.007 | Fission Products | |
| | Nd | 22.6 | Cs | 7.5 | | $NaNO_3$ | 40.6 | $AlF_3$ | 0.1 | SrO | .002 |
| | Fe | 9.9 | Sr | 5.7 | | $NaNO_2$ | 32.9 | $Na_3PO_4$—$12MoO_3$ | 0.8 | $RuO_2$ | .003 |
| | | | | | | | | | | $Ba(OH)_2.8H_2O$ | 0.1 |
| | Mo | 16.9 | N: | 2.9 | | NaOH | 1.2 | $MnO_2$ | 0.2 | | |
| | | | U | 6.3 | | NaCl | 0.004 | $Na_2U_2O_7$ | 1.0 | CsOH | 0.006 |
| (A-2) | U | 25.0 | Sr | 25.0 | | $Fe(OH)_3$ | 4.1 | | | $ZrO_2$ | 0.002 |
| | Fe | 25.0 | Na | 25.0 | | $FePO_4$ | 2.3 | Rare | | | |
| (A-3) | Th | 76.9 | Nd | 0.4 | | | | Earths | | | |
| | Fe | 16.4 | Cs | 0.3 | | | | | | | |
| | Ni | 2.4 | B | 0.1 | | $Cr(OH)_3$ | 0.5 | $Eu_2O_3$ | 0.1 | | |
| | Na | 2.3 | Sr | 0.1 | | $Ni(OH)_2$ | 0.2 | $CeO_2$ | 0.006 | | |
| | K | 1.1 | | | (B-2) | $Fe_2O_3.3H_2O$ | 43.0 | $Na_2CO_3$ | 7.7 | | |
| (A-4) | Th | 71.0 | Cs | 0.2 | | $Al_2O_3.3H_2O$ | 11.0 | $NaNO_3$ | 5.5 | | |
| | Fe | 15.2 | B | 0.1 | | $MnO_2.H_2O$ | 11.0 | $NaNO_2$ | 0.1 | | |
| | Ni | 2.2 | Sr | 0.1 | | $Ca(OH)_2$ | 3.2 | $Na_2SO_4$ | 0.9 | | |
| | Na | 2.1 | Cr | 3.7 | | $Ni(OH)_2$ | 4.9 | $Na_2C_2O_4$ | 0.01 | | |
| | | | Al | 3.2 | | $U_3O_8$ | 3.0 | Zeolite | 6.7 | | |
| | K | 1.0 | Mn | 0.2 | | $SiO_2$ | 3.0 | | | | |
| | Nd | 0.3 | Ca | 0.7 | | | | | | | |

The glass forming composition was prepared as follows:

EXAMPLE II

In another batch manufacture the following procedure was adhered to:

Aluminum Monohydroxide Preparation:
Heat 162 g deionized $H_2O$ to 85° C.
Slowly add 16 g of aluminum secondary butoxide while stirring.
Add 4 ml of 1 M $HNO_3$ (moles acid/moles Al=0.06).
Stir for 15 min., cover, and allow to age at 85° C. for 16 hr.
Preparation of the Silanol:
Add in the following sequence while stirring at room temperature:
90 g pure ethyl alcohol
9 g deionized water (0.5 mole $H_2O$/0.5 mole tetraethylorthosilicate)

1 drop concentrated (7.45 M) HNO$_3$
104 g tetraethylorthosilicate
Stir for 15 min., cover tightly, and allow to age at room temperature for 16 hrs.

After combining the above constituent while stirring for 15 minutes, an equal volume of water was introduced. The mixture was heated to ~80° C. to remove the ethanol-water azeotrope and then to ~88° C. to extract the butanol-water azeotrope. Any of the waste listed in Tables A or B could now be added while stirring in an amount corresponding to 0 to 40 wt.% oxide in the final product. Before the highly homogenized glass former-waste slurry was melted, the slurry was concentrated by evaporation to 40% solids by heating at ~90° C. for 2 hours. This concentrated slurry was now pumped at ~10-50 cm$^3$/min to a melter operating at 1100° C. After all of the slurry had been delivered to the melter, the melt was held for 1 hour, followed by furnace cooling at approximately 100° C./hr.

The most notable characteristics of our material were the ease and quiescence with which it melted. Observations of five kilogram ingots being made by continuous slurry-feed melting showed that the feed is readily assimilated by the melt within a few minutes with minimal bubbling. Withdrawal of a melt as soon as it reached the furnace temperature always gave a uniform glass product, free of bubbles and slag, and having excellent durability (leach resistance).

The resultant waste glass monolith was free of cracks, pores, and slag, and was very homogeneous as determined by metallographic evaluation and EDAX analysis. Compositional analysis showed the starting and final elemental concentrations to be essentially the same. X-ray diffraction revealed no evidence of crystalline second phases; the product was completely amorphous. Electron diffraction and transmission electron microscopy indicated no devitrification.

EXAMPLE III

The following table gives various representative glass compositions containig nuclear waste which have been prepared in the same manner as in Example I:

Silicon alkoxide hydrolysis:
191 g tetraethylorthosilicate, Si(OC$_2$H$_5$)$_4$
165 ml ethyl alcohol
15.5 ml deionized water
2 drops concentrated nitric acid
Aluminum alkoxide hydrolysis:
732 ml deionized water at 80° C.
72.3 g aluminum secondary butoxide, Al(OC$_4$H$_9$)$_3$
18 ml 1 M nitric acid
Boron alkoxide hydrolysis:
44.8 g triethylborate, B(OC$_2$H$_5$)$_3$
300 ml ethyl alcohol
24 ml deionized water
Sodium alkoxide hydrolysis:
300 ml deionized water
26.2 g sodium methylate, Na(OCH$_3$)
In each case above:
Cover tightly, and let stand at room temperature for 16 hrs.

The aluminum alkoxide was added to the silicon alkoxide, followed by the addition of the boron and then the sodium alkoxides. Additional water equalling 1000 ml was now introduced while stirring. Subsequently, the homogeneous solution was heated to ~88° C. to remove the alcohols by their respective azeotropes with water. Approximately 50% of the starting volume had been evaporated when the waste was added next. Any of the waste formulations indicated above could be added in an amount corresponding to 0-40 wt.% oxide in the final waste glass product. After the waste addition, the solids content was typically 15% by weight and may be fed directly to the melter without further concentration. However, concentration to 40 wt.% solids minimized off-gasing (e.g. steam) during melting. High-quality, slag-free and pore-free glass monoliths containing up to 40 wt.% waste were produced in this fashion with minimal volatilization, dusting, foaming, or other such events typically found in conventional waste glass manufacture. Furthermore, the product was homogeneous and totally amorphous and showed no evidence of phase separation or crystallization even with high (~30 wt.%) alumina content.

REPRESENTATIVE FINAL WASTE GLASS COMPOSITIONS (wt %)

| Waste Glass Designation | Al$_2$O$_3$ | SiO$_2$ | B$_2$O$_3$ | Na$_2$O | Fe$_2$O$_3$ | MnO$_2$ | U$_3$O$_8$ | CaO | NiO | SO$_3$ |
|---|---|---|---|---|---|---|---|---|---|---|
| Low-alumina* | 7.0 | 47.7 | 10.5 | 12.3 | 13.4 | 3.8 | 1.2 | 2.0 | 1.7 | — |
| Medium-alumina* | 14.0 | 40.7 | 10.5 | 12.3 | 13.4 | 3.8 | 1.2 | 2.0 | 1.7 | — |
| High-alumina-1* | 18.1 | 37.7 | 10.9 | 10.8 | 13.4 | 3.8 | 1.2 | 2.0 | 1.7 | — |
| High-alumina-2 | 18.1 | 37.7 | 4.0 | 10.8 | 13.4 | 3.8 | 1.2 | 8.9 | 1.7 | 0.4 |
| Nepheline syenite-1 | 28.5 | 36.9 | 10.1 | 9.6 | 5.8 | 3.8 | 1.2 | 2.0 | 1.7 | 0.4 |
| Nepheline syenite-2 | 25.5 | 39.9 | — | 9.6 | 5.8 | 3.8 | 1.2 | 12.1 | 1.7 | 0.4 |
| Nepheline syenite-3 | 25.5 | 39.9 | 6.1 | 10.8 | 5.8 | 3.8 | 1.2 | 6.0 | 1.7 | 0.4 |
| Nepheline syenite-4 | 25.5 | 39.9 | 3.0 | 9.6 | 5.8 | 3.8 | 1.2 | 10.3 | 1.7 | 0.4 |
| 211** | 3.5 | 43.0 | 7.8 | 16.2 | 13.4 | 3.8 | 1.2 | 5.9 | 1.7 | 0.4 |
| 131-3A*** | 3.3 | 44.2 | 10.5 | 13.8 | 14.0 | 4.1 | — | 1.3 | 1.7 | 0.1 |
| Thorex**** | 6.0 | 54.0 | 0.1 | 1.0 | 7.9 | — | — | — | 1.0 | — |
| Purex+ | 6.9 | 63.0 | — | 23.6 | 2.9 | — | 1.1 | — | 0.2 | — |
| High-Silica++ | 10.0 | 80.0 | — | 2.5 | 2.5 | — | 2.5 | — | — | — |
| Commercial+++ | 6.2 | 42.0 | 5.0 | 6.8 | 4.1 | — | 3.0 | — | 1.5 | — |

*Also contains 0.3% total of equal amounts of CaO, SrO, Nd$_2$O$_3$, RuO$_2$ and HgO
**Also contains 3.1% Li$_2$O
***Also contains 4.1% Li$_2$O, 1.4% MgO, 0.7% TiO$_2$, 0.4% La$_2$O and 0.4% ZrO$_2$
****Also contains 29.3% ThO$_2$, 0.5% K$_2$O, 0.1 Nd$_2$O$_3$, and 0.1 CaO
+Also contains 0.12 Cr$_2$O$_3$, 0.09 MoO$_3$, 0.003 BaO, 0.0002 Eu$_2$O$_3$, 0.00005 RuO$_2$, and 0.00003 ZrO$_2$
++Also contains 2.5 SrO
+++Also contains 6.0% MoO$_3$, 8.1% Nd$_2$O$_3$, 4.1% CaO, 5.2% ZrO$_2$, 2.7% SrO, and 5.3% CeO$_2$

EXAMPLE IV

An alternate compositional preparation is as follows:

We claim:
1. A method of containing nuclear waste comprising:
(A) preparing a composition which comprises

(1) about 25 to about 80% calculated as SiO$_2$, of a compound having the general formula SiR$_m$(OR')$_n$X$_p$, Si(OSiR$_3$)$_4$, or mixtures thereof, partially hydrolyzed;

(2) up to about 30%, calculated as the metal oxide, of a compound having the general formula AlR'$_q$(OR'')$_r$X$_s$, Mg(Al(OR)$_4$)$_2$, CaR$_t$(OR'')$_u$X$_v$, or mixtures thereof, partially hydrolyzed if hydrolyzable;

(3) about 5 to about 20%, calculated as the metal oxide, of a compound having the general formula BR'$_q$(OR)$_r$X$_s$, CaR$_t$(OR'')$_u$X$_v$, or mixtures thereof, partially hydrolyzed;

(4) about 3 to about 25% calculated as the metal oxide, of a compound having the general formula MOR'', MZR'$_3$, or mixtures thereof, partially hydrolyzed if hydrolyzable, where the total calcium content, calculated a CaO, does not exceed 15%, and where each R is independently selected from alkyl to C$_{10}$ and alkenyl to C$_{10}$, and each R' is independently selected from R and aryl, each R'' is independently selected from R and hydrogen, each X is independently selected from chlorine and bromine, each M is independently selected from sodium, potassium, and lithium, each Z is independently selected from carbon and boron, m is 0 to 3, n is 0 to 4, p is 0 to 1, each q is independently selected from 0 to 3, each r is independently selected from 0 to 3, each s is independently selected from 0 to 1, each t is independently selected from 0 to 2, each u is independently selected from 0 to 2, each v is independently selected from 0 to 1, and m+n+p=4, q+r+s=3, and t+u+v=2, (5) alcohol in a weight ratio to hydrolyzed alkoxide of about 0.5 to about 3, calculated as alkoxide; and (6) sufficient water to remove at least 99% of said alkanol as an azeotrope;

(B) boiling off said azeotrope;

(C) mixing up to about 40%, based on solids in the product, calculated as oxide, of said nuclear waste into said composition;

(D) evaporating said mixture to about 25 to about 45% solids; and (E) melting and cooling said mixture.

2. A method according to claim 1 wherein n=4, r=3, t=2, and R=R'=R''=alkyl to C$_4$.

3. A method according to claim 2 wherein M is Na.

4. A method according to claim 1 wherein said partially hydrolyzed silicon compound is produced by reacting said silicon compound with water in an alkoxide: water mole ratio of about 0.1 to about 5 in the presence of said alkanol in an alkoxide:alkanol ratio of about 0.2 to about 2, said partially hydrolyzed aluminum compound is produced by reacting said aluminum compound with water in an alkoxide:water mole ratio of about 0.0007 to about 0.03 in the presence of about 0.03 to about 0.01 moles of 1 M HNO$_3$ per mole of AlO(OH) produced, said B(OR)$_3$ or, Ca(OR')$_2$ compound, is produced by reacting said boron or calcium compound with water in an alkoxide:water mole ratio of about 0.05 to almost 5 in the presence of said alkoxol in an alkoxide:alkanol ratio of about 0.03 to about 0.2, and said hydrolyzed NaOR, said hodrolyzed KOR' and said partially hydrolyzed LiOR' are produced by reacting said compounds with water in an alkoxide:water mole ratio of about 0.005 to about 0.09.

5. A method according to claim 1 wherein said mixture is melted in situ.

6. A product made according to the method of claim 1.

7. A method of containing nuclear waste comprising
(A) preparing a composition which comprises
 (1) about 40 to about 50% calculated as SiO$_2$, of Si(OR)$_2$, partially hydrolyzed;
 (2) about 20 to about 30%, calculated as Al$_2$O$_3$, of a compound selected from the group consisting of Al(OH)$_3$, Al$_2$O$_3$, Al(OR)$_3$, and mixtures thereof, partially hydrolyzed if hydrolyzable;
 (3) about 10 to about 15%, calculated as B$_2$O$_3$, of B(OR)$_3$, partially hydrolyzed;
 (4) about 10 to about 15%, calculated as Na$_2$O, of a compound selected from the group consisting of NaOH, Na$_2$O, NaOR, partially hydrolyzed if hydrolyzable, and mixtures thereof,
 where each R is independently selected from alkyl to C$_4$;
 (5) alkanol up to C$_4$ in a weight ratio of alkanol to partially hydrolyzed alkoxide of about 0.5 to about 3, calculated as alkoxide;
 (6) sufficient water to remove at least 99% of said alkanol as an azeotrope;
(B) boiling off said azeotrope,
(C) mixing up to about 40%, based on solids in the product, calculated as oxide, of said nuclear waste into said composition;
(D) evaporating said mixture to about 35 to about 40% solids; and
(E) melting and cooling said mixture.

8. A method according to claim 7 wherein said mixture is melted in situ.

9. A method according to claim 7 wherein said mixture is melted at about 1000° to about 1200° C.

10. A method according to claim 7 wherein said nuclear waste is an aqueous sludge containing dissolved salts, and hydrated oxides and hydroxides of elements selected from the group consisting of Al, Fe, Ni, Cr, Mg, Mn, Si, Na, Hg, Nd, Ce, Cs, Sr, Ti, Ca, Ni, Pu, Th, Zr, Mo, and mixtures thereof.

11. A method according to claim 7 wherein the amount of said nuclear waste mixed into said composition is about 25 to about 35% solid nuclear waste based on product weight calculated as oxide.

12. A method according to claim 7 wherein said alkanol is ROH and each R group in said composition is the same.

13. A method according to claim 7 wherein said aluminum compound is added to said hydrolyzed Si(OR)$_2$, then said hydrolyzed B(OR)$_3$ is added, and finally said sodium compound.

14. A product made according to the method of claim 7.

* * * * *